March 7, 1967 B. D. CAULKINS 3,307,282
TIRE DISPLAY
Filed April 20, 1965
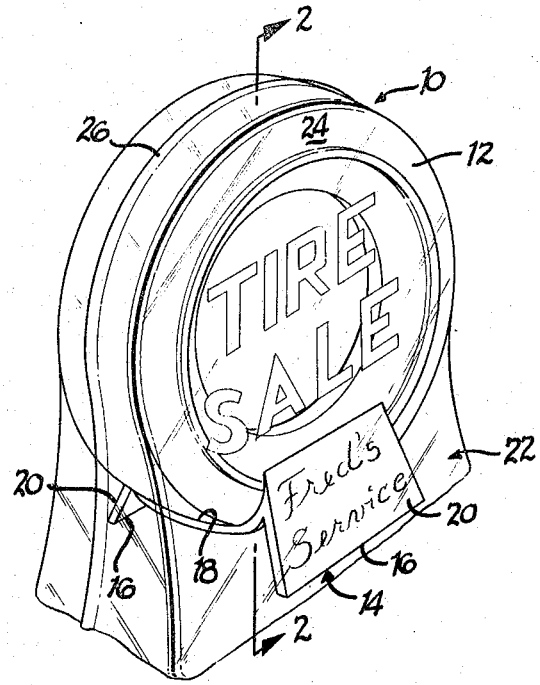
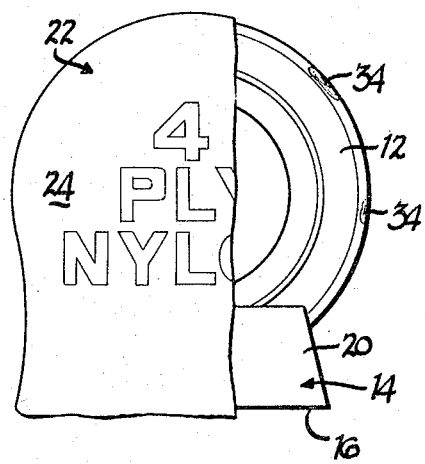
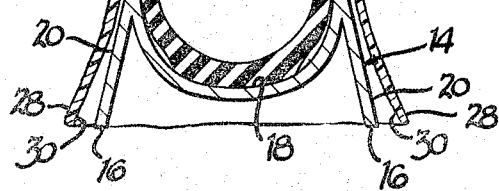
Inventor.
BRUCE D. CAULKINS
BY
ATTORNEYS

3,307,282
TIRE DISPLAY
Bruce D. Caulkins, 19925 Varnier Road, Harper Woods, Wayne County, Mich. 48213
Filed Apr. 20, 1965, Ser. No. 449,427
1 Claim. (Cl. 40—125)

The present invention relates generally to a pneumatic tire display and more particularly to a sheet plastic envelope surrounding and displaying such a tire supported in a vertically erect position.

It has been for some time and remains current commercial practice to display pneumatic tires at service stations and the like in an upright, vertically erect orientation by resting the tire within an appropriate ground engaging stand. Frequently, cardboard and like inserts are placed within the annular openings in the sidewalls of the tire being displayed. These inserts normally carry some type of advertising message, written, pictorial and the like.

Such tire displays are objectionable since: (1) the tire displayed, to be a worthwhile advertising technique, must be a new tire, which becomes soiled when exposed to the weather and is subject to being stolen if unattended; (2) the advertising cardboard inserts do not have good wear resisting qualities and do not remain attractive in appearance for a prolonged period of time, but rather tend to discolor and warp when exposed to sunshine, to rain and the like, and; (3) each insert permits rain to readily enter and accumulate within the tire casing on display.

In view of the foregoing, it is a primary object of this invention to overcome the above-recited prior art deficiencies by providing a novel pneumatic tire display.

It is an additional object of this invention to provide a novel tire display, including a sheet plastic envelope, having one or more of the following features;

(1) Attractive in appearance;
(2) Good wear resisting qualities; and
(3) the plastic envelope of which: (a) keeps the tire completely clean and free from the weather, when used outdoors, (b) may be pigmented, opaque or otherwise colored to conceal a substantially worn-out tire used in the display (this reduces the risk of theft and cleans up the appearance of the service station by hiding one or more worn-out tires which otherwise might create an unsightly appearance), (c) prohibits rain from entering the tire casing, (d) is inexpensive, and (e) if the envelope becomes soiled or worn, it may be simply slipped off and another plastic display cover slipped on over the display tire.

It is a further object of this invention to provide a novel method of making and using a sheet plastic display envelope for exhibiting pneumatic tires.

These and other objects and features of this invention will become more fully apparent from the appended claim as the ensuing detailed description proceeds in conjunction with the acompanying drawings, in which:

FIGURE 1 is a perspective of a presently preferred tire display of this invention;

FIGURE 2 is a cross sectional view taken along line 2—2 of FIGURE 1; and

FIGURE 3 is a front elevational view of another presently preferred tire display illustrating an opaque plastic envelope covering a substantially worn-out tire.

Reference is now made to the drawings wherein like numerals are used to designate like parts throughout.

FIGURE 1 shows a presently preferred tire display, generally designated by the numeral 10, of this invention in perspective. The tire display 10 comprises a tire 12 supported in a generally vertically erect position by a stand or bracket 14 which engages the ground at 16 and provides a recess 18, annularly shaped in cross section so that the tire 12 is stably supported. The stand 14 may be provided with an advertising message on one or both of the surfaces 20.

The tire 12 and the stand 14 are covered by plastic display tire cover or envelope 22.

As depicted in FIGURE 2, the plastic envelope or cover 22 comprises a pair of substantially identical sheets of plastic film 24 preferably united to form a juncture 26 by heat sealing or the like, the juncture 26 extending along three sides of common marginal edges 28 of the two sheets of plastic film 24. The marginal edges 28, as seen at the lower part of FIGURE 2, form an opening generally designated 30 which opening accommodates downward placement of the plastic envelope 22 over the tire 12 and the support 14 once the opening has been positioned immediately above the upper tire surface 32.

Of course, in place of the juncture 26, an additional portion of plastic material may be placed between the two sides 24 if desired.

Thus, the plastic envelope or cover 22 is simply and inexpensively manufactured by merely fabrication of substantially identical sidewall sheets 24 followed by the superimposing of the two sidewall sheets together and the uniting, for example by heat sealing, of the sidewalls as a common juncture 26 along three sides of the two sidewalls. The fourth margin is left open at 30 for placement of the envelope 22 in the position depicted in FIGURE 2.

As clearly evident from FIGURE 1 both of the sheets of plastic film 24, constituting portions of the envelope 22, drape or hang loosely down across one of the sidewalls of the tire 12 and, in most instances, will contain advertising indicia, for example, written or pictorial advertising such as the words "Tire Sale," depicted in FIGURE 1. Thus, the entire tire 12 and stand 14 are protected from the weather and other exposure which might damage or otherwise soil the tire.

The display cover or envelope 22 may be in any desired color, opaque, transparent (clear) or pigmented. For example, an opaque plastic display cover 22, as seen in FIGURE 3, may be utilized to cover a worn-out tire 12 shown as having two holes 34 in the thread. Thus, it is not necessary to display a new and valuable tire. In this manner, the risk of theft is eliminated and the appearance of the service station or the like, where the display exists, is cleaned up since one or more worn-out tires are used on display, which would otherwise likely create a very unsightly appearance on the grounds of the service station. Moreover, where worn-out tires are used, the displays may be left in place out of doors even when the service station is closed without fear of significant loss through theft.

In view of the foregoing, it is to be appreciated that the present invention provides an attractive, simplified tire display which keeps the tire completely enclosed and thus clean and free from the weather. The plastic display cover may be opaque or pigmented to conceal a substantially worn-out tire thus alleviating risk of theft and improving the appearance of the display area. The plastic envelope succeeds in completely eliminating entrance and accumulation of water into the tire. The tire cover is very inexpensive and if it becomes soiled or worn it is a simple matter to remove the soiled envelope by slipping it off followed by placement of another display plastic cover over top of the tire.

While only a single tire is described and illustrated in the foregoing it is to be appreciated that racks or tiers of tires may similarly be protected by use of a somewhat larger plastic cover or envelope but of the type herein disclosed, and as such would come within the scope of this invention.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In combination, a substantially worn-out tire, and a ground engaging support holding the tire in a generally vertically upright position and a hollow plastic envelope completely enclosing the tire, said plastic envelope comprising (1) two sheets of plastic film, (2) a heat sealed joint between said sheets along three common sides of the envelope with the fourth side being open, (3) a pigmented coloration concealing the worn-out appearance of the tire from the view of onlookers, and (4) advertising indicia carried by at least one of said sheets, said support comprising a U-shaped recess engaging the lower side of said tire, indicia on exposed walls of said support viewable through said envelope.

References Cited by the Examiner

UNITED STATES PATENTS

| | | | |
|---|---|---|---|
| 1,370,549 | 3/1921 | Newton | 150—54 |
| 1,557,943 | 10/1925 | Musto | 150—54 |
| 1,628,306 | 5/1927 | Clark | 211—24 |
| 1,883,195 | 10/1932 | Wengard | 40—129 |
| 2,849,045 | 8/1958 | Anderson | 150—54 |
| 3,009,707 | 11/1961 | Schulein | 40—125 X |

EUGENE R. CAPOZIO, *Primary Examiner.*

HERBERT F. ROSS, *Examiner.*